United States Patent [19]
Dunkley et al.

[11] Patent Number: 4,937,749
[45] Date of Patent: Jun. 26, 1990

[54] SEMI-AUTOMATIC MECHANICAL TRANSMISSION CONTROL AND CONTROL METHOD

[75] Inventors: Michael W. Dunkley, Longride; John E. Stainton, Chorley, both of Great Britain

[73] Assignee: Eaton Corporation, Cleveland, Ohio

[21] Appl. No.: 274,265

[22] Filed: Nov. 18, 1988

[30] Foreign Application Priority Data

Dec. 10, 1987 [GB] United Kingdom ............... 8728837

[51] Int. Cl.$^5$ .................. G06F 15/20; B60K 41/08
[52] U.S. Cl. .................................. 364/424.1; 74/866
[58] Field of Search ............... 364/424.1; 74/866; 73/116, 117; 180/170, 178

[56] References Cited

U.S. PATENT DOCUMENTS

| Re. 32,591 | 2/1988 | Richards | 74/866 |
|---|---|---|---|
| 4,335,428 | 6/1982 | Miki et al. | 364/424.1 |
| 4,361,060 | 11/1982 | Smyth | 74/866 |
| 4,517,646 | 5/1985 | Magnusson et al. | 364/424.1 |
| 4,539,868 | 9/1985 | Habu | 364/424.1 |
| 4,564,906 | 1/1986 | Stephan et al. | 364/424.1 |
| 4,648,290 | 3/1987 | Dunkley et al. | 74/866 |
| 4,648,291 | 3/1987 | Klatt et al. | 364/424.1 |
| 4,829,852 | 5/1989 | Sakakiyama | 74/866 |

FOREIGN PATENT DOCUMENTS

| 2001941 | 10/1970 | Fed. Rep. of Germany . |
|---|---|---|
| 3113590 | 2/1982 | Fed. Rep. of Germany . |
| 0170465 | 2/1986 | Fed. Rep. of Germany . |
| 8602112 | 4/1986 | Fed. Rep. of Germany . |
| 0238310 | 9/1987 | Fed. Rep. of Germany . |

Primary Examiner—Parshotam S. Lall
Assistant Examiner—Christopher L. Makay
Attorney, Agent, or Firm—H. D. Gordon

[57] ABSTRACT

A control system and method for a semi-automatic mechanical transmission system (10) is provided for sensing high resistance to vehicle forward movement and allowing engagement of a gear ratio lower than the lowest engageable ratio at substantially constant vehicle speed.

8 Claims, 4 Drawing Sheets

SEMI-AUTOMATIC MECHANICAL TRANSMISSION CONTROL AND CONTROL METHOD

BACKGROUND OF THE INVENTION

1. Field Of the Invention

The present invention relates to a control system and control method for a vehicular semi-automatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch in all but start from stop situations. Transmission systems of this type are illustrated in U.S. Pat. No. 4,648,290, the disclosure of which is hereby incorporated by reference.

More particularly, the present invention relates to a control and method of controlling a semi-automatic mechanical transmission wherein system inputs are processed in accordance to predetermined logic rules to determine if the vehicle is travelling up a hill and the lowest permissibly engaged gear ratio is determined accordingly.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic and/or pneumatic logic and actuators to engage and disengage mechanical (i.e. positive) clutches to achieve a desired gear ratio. Examples of such transmissions may be seen be reference to U.S. Pat. Nos. 3,961,546; 4,081,065; 4,361,060; 4,569,255; 4,576,065 and 4,576,263, the disclosures of which are hereby incorporated by reference.

Such fully automatic change gear transmissions can be unacceptably expensive, particularly for the largest heavy-duty vehicles which are not typically sold in high volumes Additionally, those automatic change gear transmissions utilizing pressurized fluid and/or torque converters tend to be relatively inefficient in terms of power dissipated between the input and output shafts thereof Moreover, many vehicle operators like to control the selection of the gear ratios, particularly since they can see and/or know the nature of the road ahead and/or of the load being carried. Heavy-duty vehicles must often by accurately maneuvered into restricted spaces at slow speeds, wherein fully automatic transmissions tend to only engage a given low gear. Particularly at such times, when fuel metering to the engine is imperfect, as often happens temporarily in any vehicle system, the vehicle operator tends to have difficulty in performing delicate maneuvers with a fully automatic transmission, especially those not equipped with a manual clutch control pedal, unless the operator is also utilizing the vehicle brake with his left foot.

The above drawbacks have been minimized by providing a semi-automatic mechanical transmission control wherein automatic changing between a plurality of gear ratios is provided while normally permitting the driver to choose when to make a particular gear ratio change, whether to select the immediately consecutive ratio up or down or to skip one or more ratios, and when to slip, i.e. to incompletely engage, the vehicle master clutch in a low or crawler gear. Furthermore, the semi-automatic control system prohibits engagement of a driver selected higher ratio, i.e. an upshift, that would cause the engine speed to decrease below the idle speed, i.e. would cause stalling and/or overstressing at low speeds of the engine, and of a lower ratio, i.e. a downshift, if such a change would cause overspeeding of the engine. It is noted that with manual mechanical transmissions such overspeeding of the engine can occur due to a improper downshift even though the engine speed may be governed against accelerating above the governed engine RPM. Examples of such a semi-automatic transmission control can be seen by reference to above mentioned U.S. Pat. No. 4,648,290.

While the above-described semi-automatic mechanical transmission control does provide a very desirable semi-automatic control, the control was subject to improvement as the permissibly engaged ratios are determined on the basis of current vehicle speed which, if the vehicle is travelling up a steep grade, may not allow downshifting into a desirable gear ratio.

SUMMARY OF THE INVENTION

In accordance with the present invention, the drawbacks of the prior art vehicular semi-automatic mechanical transmission control have been minimized or eliminated by the provision of a control and control method which processes system inputs to determine if the vehicle is decelerating due to travelling up a grade and, if such upgrade travel is sensed, allows the engagement of a lower ratio then normally permitted.

The above is accomplished by calculating vehicle acceleration or deceleration (hereinafter called acceleration) and if acceleration is less than a reference value while the fuel supplied to the engine is greater than a reference value, allowing the engagement of an additional lower gear ratio.

Accordingly, it is an object of the present invention to provide a new and improved control method for vehicular semi-automatic mechanical transmission having a control for automatically determining allowable up and down shifts from a given gear ratio, preferably for automatically displaying same, and having logic for sensing vehicle deceleration due to high resistance and for allowing downshifting into a lower gear ratio than ordinarily allowed at current vehicle speed.

This and other objects and advantages of the present invention will become apparent from a reading of the following description of the preferred embodiments taken in connection with the attached drawings.

DESCRIPTION OF THE PREFERRED EMBODIMENT

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, and European Patent No. 0,070,353, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent No. 0070353, first published Feb. 9, 1983 (EP-A-0071353) and European Patent Application No. 83307061.8, published Sept. 5, 1984 (EP-A-0117342), the disclosures of which publications are hereby incorporated by reference.

The semi-automatic transmission system to which the present invention is particularly advantageously related, is described and illustrated in European Patent application No. 85305072.2, published Feb. 5, 1986 (EP-A-0 170 465), and above-mentioned U.S. Pat. No. 4,648,290, the disclosures of which publication is hereby incorporated by reference.

Figure 1:
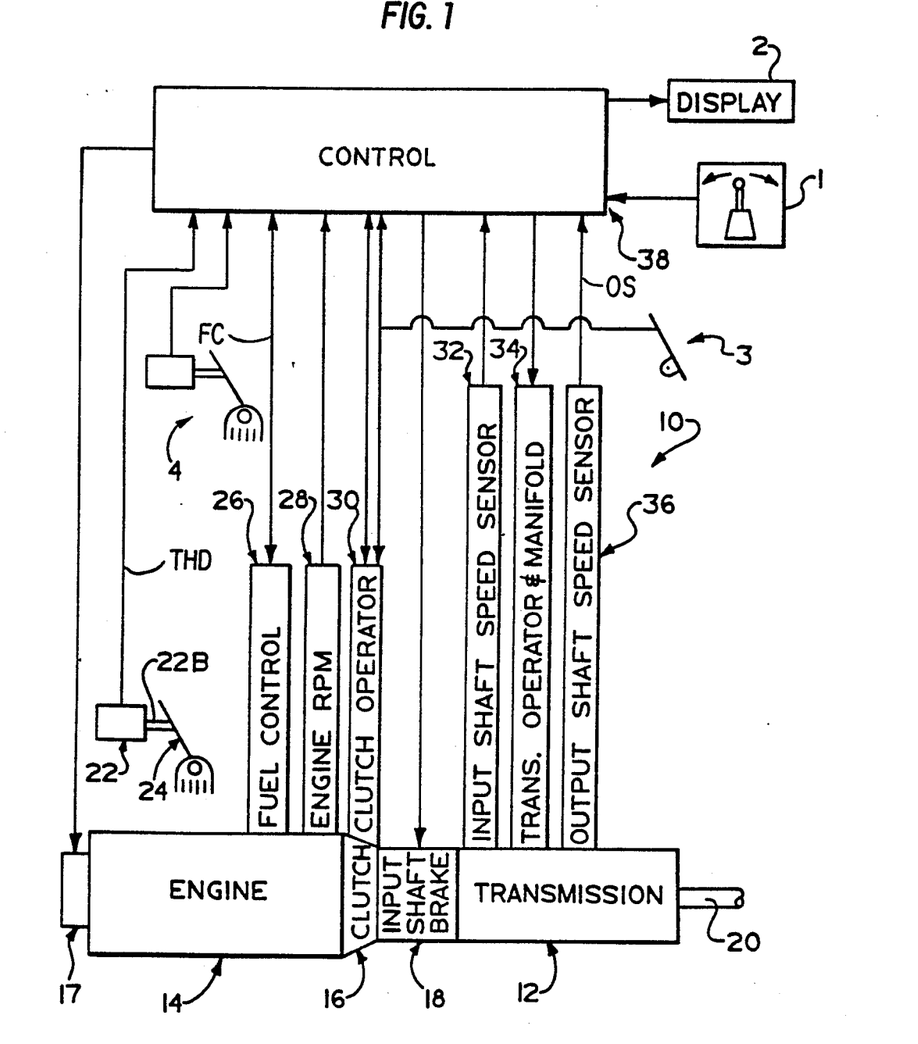
FIG. 1 is a schematic illustration of the semi-automatic mechanical change gear transmission system of the present invention.

Referring to FIG. 1, the position of a driver-operated throttle 24 is sensed at sensor 22 and a signal indicative thereof (THD) fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that engine speed is an indication of transmission input shaft speed, and visa versa, especially if clutch 16 is nonslippingly engaged, while transmission output shaft speed is an indication of vehicle speed.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

For control of vehicle SAMT systems 10, such as the systems illustrated in above-mentioned U.S. Pat. Nos. 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%). This is the parameter monitored by plunger 22B of sensor assembly 22 and provides what will be referred to as the "throttle demand potentiometer" or "THD" input signal to control 38.

Figure 2:
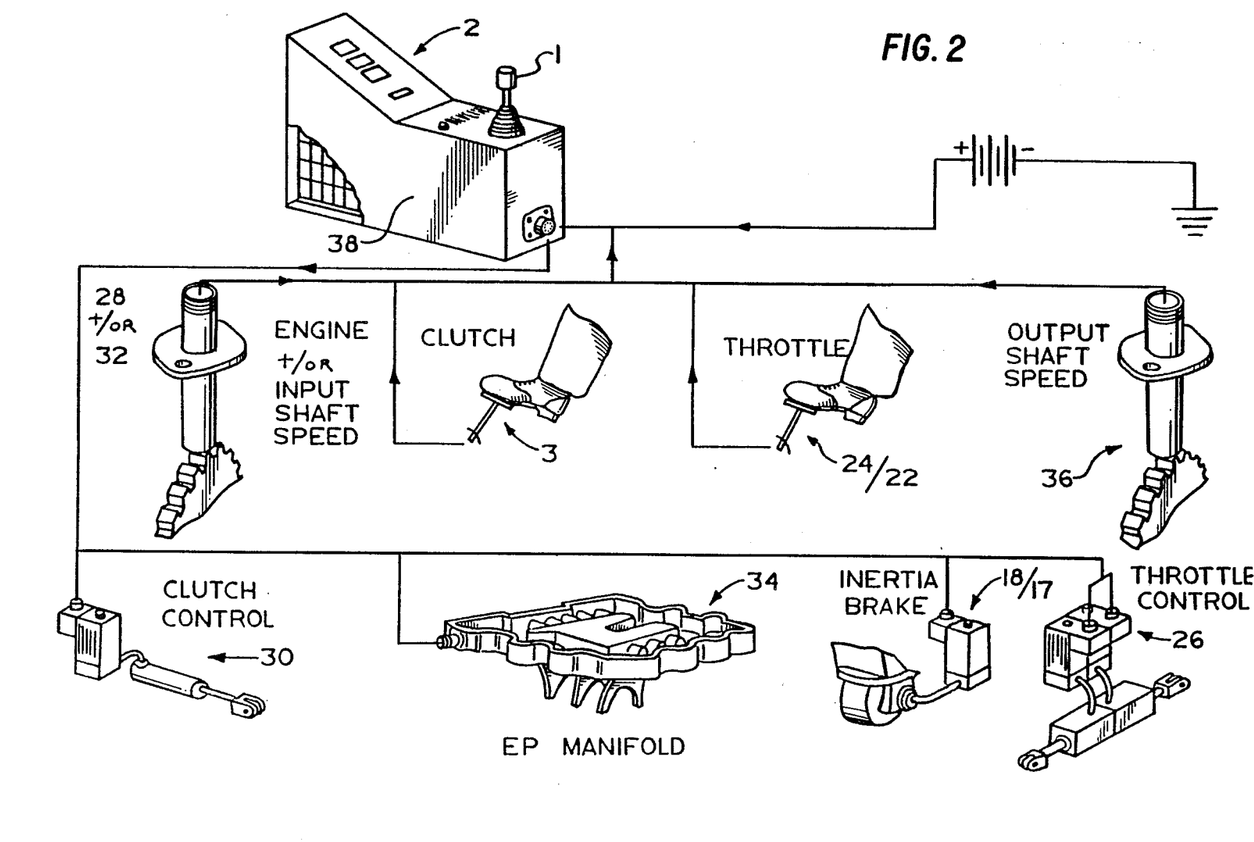
FIG. 2 is a schematic illustration of the control system of the semi-automatic transmission of the present invention.

Control logic circuits, sensors, and actuators for the transmission system 10 as disclosed in FIGS. 1 and 2, may be as disclosed in U.S. Pat. No. 4,361,060, the disclosure of which is hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The central processing unit also sends command output signals to the display 2 to be described in greater detail below. The semi-automatic transmission system 10 additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3:
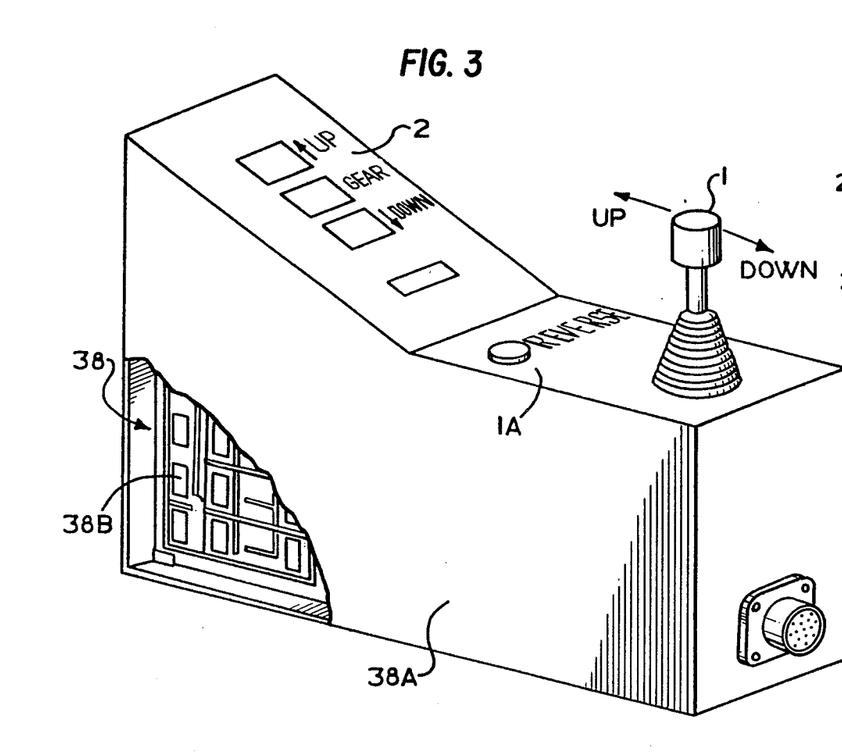
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2'", the shift select lever 1, an optional reverse enable button 1A, as well as a central processing unit 45 electronic circuitry 38B.

The schematics of the control system of the semi-automatic mechanical transmission system 10 are also illustrated in FIG. 2.

Figure 3B:
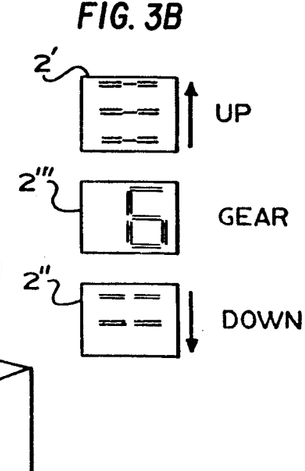
FIG. 3B is an enlarged view of a portion of the display illustrated in FIG. 3.

Referring to FIG. 3B, the display 2 includes upshift indicator section 2', downshift indicator section 2" and currently engaged gear ratio indicator section 2'". As illustrated, the currently engaged gear ratio display section 2'" is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissable shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permitable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank, i.e. has no horizontal lines displayed therein, no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system and method of the present invention that, whenever the vehicle is brought to a complete stop from greater than a predetermined reference speed (to distinguish a traffic situation from an inching situation), the clutch 16 is manually disengaged by means of foot pedal 3 and the operator's foot is on the throttle (indicating an intention to resume vehicle travel), and the lever 1 is moved in the downshift direction once, the control will automatically shift transmission 12 to a preselected starting gear, preferably the highest permissible starting gear ratio, which may involve skip-shifting over a large plurality of intervening gear ratios. By way of example, in a twelve forward speed transmission, the highest permissible starting ratio may be third gear. Another lever movement in the downshift direction would the shift the transmission to second for a quicker or slightly uphill start, etc. The operator, at rest or in motion, can always select a gear ratio from those permitted. The manual clutch is only intended for use preparatory to stopping to disengage the transmission and avoid stalling and during starting from rest in any of the permissible starting gear ratios. If, during a semi-automatic shift, if the driver operates the manual clutch, the in-process gear change will be interrupted and will only continue upon re-engagement of the manual clutch.

As an optional feature, if in an emergency situation, such as during evasion of an obstacle in the road etc., the operator stops the vehicle without declutching the manual clutch, the very low road speed is sensed and the clutch 16 may be automatically disengaged. Such an automatic declutching procedure will prevent stalling of the engine, thus retaining steering and other engine driven powered functions. To again place the vehicle in motion, the operator will manually disengage clutch 16 and move the gear lever 1 in the downshift direction to again select the highest permissible starting ratio.

Preferably, transmission 12 is a multi-speed transmission having at least five, preferably nine or more, selectable forward ratios. The structure of a twelve forward speed splitter type transmission 12, and of the blocked jaw clutch members utilized in the auxiliary transmission section of transmission 12, is known in the prior art and may be appreciated in greater detail by reference to above mentioned U.S. Pat. Nos. 3,799,002: 3,921,469: 3,924,848; 4,194,410; 4,440,037;. and to published European Patent Applications Nos. EP-A-0071353 and EP-A-0117342.

The typical operation of the permissible ratio determination procedure and ratio change operating of the control system of the invention are now further explained.

The functions and components for the semi-automatic transmission are, gear ratio change selection switch or lever 1, display panel 2, control box 38, speed sensors 32, 36, engine (fuel) control 26, throttle and clutch sensors 22, 3 (detecting the driver's depression of them), electro-pneumatic control of shifts, clutch and brakes (using the engine manifold vacuum, together with a vacuum servo-follower if required), the input brakes 17 and/or 18 and their actuators, control cables, and the clutch actuator 30.

Referring to the items 1, 2 and central control unit 38, these input the driver's change requirements, tell him what gear he is in, which other ratios he can choose at any moment, including from rest, from sensed engine and vehicle status necessary to complete any gear shifts, either single or skip. Shifting is accomplished by the single or plural movement of the gear level 1, either forwards for up shifts or backwards for down shifts. The gear shift lever is spring biased to return to the rest or vertical position and one movement of the lever will instigate one shift control.

Control of the engine is by fuel control 26 which includes two (2) solenoid valves, one associated with the engine "dipping" and the other with engine "blipping". Dipping is used not only for up changes, but also preparatory to down changes to break the torque line. A back-to-back double pneumatic piston, which is slaved to the solenoid valves, provides servo pump manipulations, if desired without driver feel. These units respond to signals from the electronic panel. A "fly-by-wire" throttle control or full electronic engine management can be accommodated by the system.

In order for the system to function correctly it is necessary to identify the existence of full clutch and part-throttle actuations, this will be achieved by the placement of switches (micro or proximity) at least at the full extends of the clutch and initial accelerator movements from the driver's foot pedals.

The transmission operator 34 includes an electro pneumatic ("EP") manifold is preferably broken down into two elements. The first associated with the front box and the second with back box operations. The EP manifold is a manifold controlled by solenoid valves and associated with the cylinders carrying the shift pistons.

The operator 34 also includes a shift unit with comprising air pistons moved by the servo operation of the appropriate EP valve as it is signaled from the electronic control box 38.

The driver could be instructed as follows: The vehicle will be stationary, air pressure at the right level, hand brake on, clutch disengaged and acceleration at idle. Neutral will be indicated in the display unit. The driver will move the gear lever forward once, thus pre-disposing the unit to start in the lowest ratio. No engagement has yet been made. The clutch pedal will be depressed and the micro switch becomes actuated at the extent of the travel.

With the engagement of first gear, the release of the clutch pedal and application of the throttle when the hand brake is released, the vehicle will move and normal acceleration follows. At the desired speed the driver may then select the next highest ratio by a single manipulation of the gear lever forwards. At zero speed one movement of the lever will return the gearbox to a starting gear from its status when the vehicle has come to rest.

The visual indication will be in such a position that the appropriate gear is shown without the need for the driver to divert fully his attention from the road ahead. The electronic panel, including CPU 38, receives the driver's commands from the gear selector unit, speed signals from the gearbox input and output shafts and will send commands to the EP manifold, shift unit, up shift inertia brake, engine and clutch control such that semi-automatic shifting is accomplished.

Thus, it will be seen that the gear changes in the preferred embodiments do not depend on torque, although that could be built in. They are permitted in dependence only on the starting and finishing speeds, and on the actual gear engaged and the possible selected ratio.

It is emphasized that compared with a fully automatic transmission, the present semi-automatic transmission provides driver control and discretion, particularly advantageous at very low speeds and where the terrain or road conditions ahead may be difficult. He does not need to use the throttle and clutch to change ratios, except when starting from rest, or maneuvering. A cruise control or a governed top road speed could easily be incorporated in the control box 38. The driver feels negligible feedback on his foot when the throttle is being operated for shifts. The shifts are very rapid, so that the displayed condition of permissible shifts (e.g. skipping two ratios on an upshift) does not change during the brief time of the shift, the vehicle not appreciably slowing down. A normal synchromesh or nonsynchronized mechanical change gear gives no protection for the engine racing, or laboring at idle speeds after a misjudged but allowed and completed change.

Figure 4:
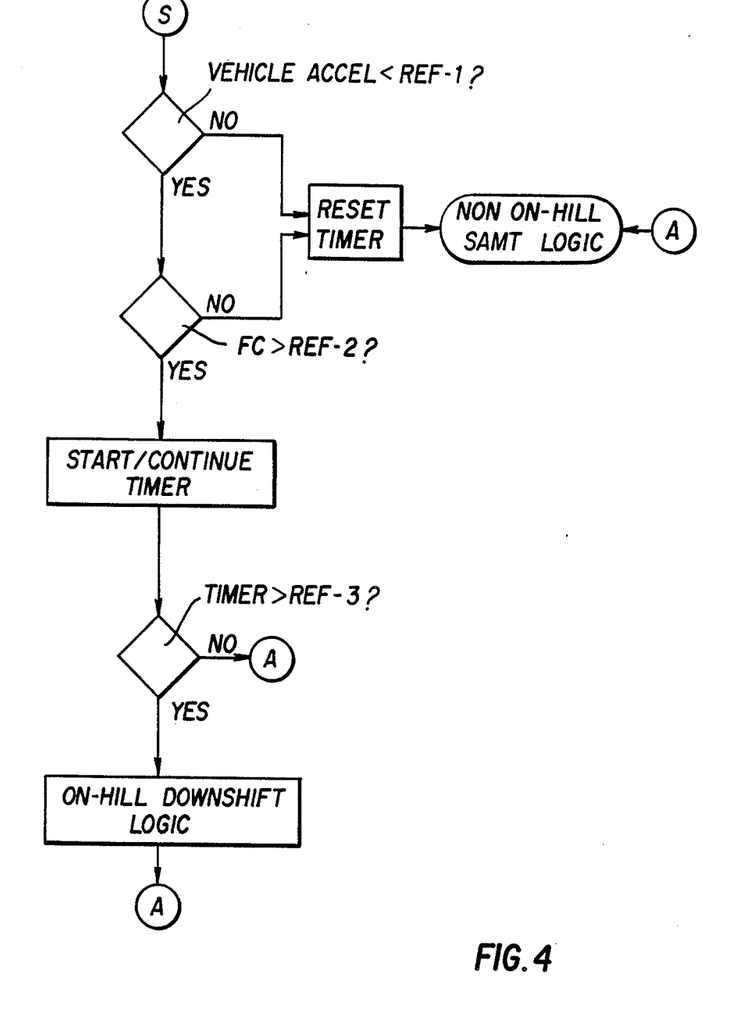
FIG. 4 is a schematic illustration, in the form of a flow chart, of the control method of the present invention.

As an additional feature, as illustrated in FIG. 4, the CPU 38 is provided with logic rules to sense vehicular deceleration due to high resistance, such as vehicle travel up a hill or grade, and, if such conditions are sensed, to permit the engagement of the next lowest ratio than the lowest normally permissible engaged ratio at a given vehicle speed. For example, assuming 6th gear is engaged and, at current vehicle speed, downshifts to 5th or 4th speed are permissible, if high resistance conditions are sensed, an additional downshift to third speed will be permitted. This will, of course, provide the advantage of not limiting the vehicle operator to unsuitable or less than optimal gear selections when downshifting on an upgrade.

As a subroutine to the NON ON HILL SAMT LOGIC, the CPU 38 will sense vehicle acceleration (i.e. the derivative of output shaft speed relative to time) and will compare that value to a reference value, REF-1. If vehicle acceleration is less than the reference value while the fuel to the engine, FC, is greater than a reference value, REF-2, high resistance to vehicle movement conditions exist. REF-2 is preferable equal to greater than seventy-five percent (75%) of wide open throttle.

When such high resistance conditions exist, and have existed for at least a predetermined period of time, REF-3, "ON-HILL DOWNSHIFT LOGIC" is implemented which allows the permissible engagement of a ratio one ratio lower than the lowest ratio permissibly engage under NON ON-HILL SAMT LOGIC at the current vehicle speed. The timer which may be internal of CPU 38 is utilized to prevent implementation of ON-HILL DOWNSHIFT LOGIC in momentary high resistance conditions.

As an optional feature, the extra permissible downshift will be indicated in display portion 2", preferably by a flashing member, to inform the vehicle operator that an additional downshift is available (and/or recommended) due to high resistance to vehicle forward motion.

Although the preferred embodiment of the present invention has been described with a certain degree of particularity, various changes to form and detail may be made without departing from the spirit and scope of the invention as hereinafter claimed.

We claim:

1. A method of controlling a vehicular semi-automatic mechanical change gear transmission system (10) comprising a manual fuel throttle control (24), a fuel throttle controlled engine (14), a multi-speed change gear mechanical transmission (12), a friction clutch (16) interposed the engine and transmission, a manually operated shift selection lever (1) to select upshifts and downshifts from the currently engaged gear ratio, a central processing unit (38) for receiving inputs indicative of transmission input shaft and output shaft rotational speeds, of vehicle speed, of engine speed, of the fuel to the engine, and of operation of said shift selection lever and for processing same according to predetermined logic rules to determine the currently engaged gear ratio and the permissibly engaged gear ratios of said transmission under current operating conditions and to issue command output signals to non-manually controlled operators including a fuel throttle control operator (26), and a transmission operator (34); said method comprising:

sensing the presence or absence of conditions indicative of high resistance to forward movement of the vehicle, and if the presence of conditions indicative of high resistance to forward movement of the vehicle are sensed, permitting the engagement of the gear ratio one ratio lower than the lowest gear ratio permissably engaged in the absence of said conditions at current vehicle speed;

the presence of said conditions being sensed only if vehicle acceleration (dOS/dt) remains less than a first reference value (REF-1) and fuel to the engine (FC) remains greater than a second reference value (REF-2) for at least a predetermined period of time (REF-3).

2. The method of claim 1, wherein said second reference value (REF-2) corresponds to about seventy-five percent (75%) of full throttle.

3. The method of claim 1, wherein said second reference value (REF-2) corresponds to about seventy-five percent (75%) of full throttle.

4. The method of claim 1 additionally comprising:
providing a first section displaying information indicative of the currently engaged gear ratio;
providing a second display section displaying information indicative of the highest permissible engagable gear ratio, said second display section displaying zero, one, two or three symbols indicating the maximum permissible number of consecutive upshifts from the currently engaged gear ratio is zero, one, two or three, respectively; and
providing a third display section displaying information indicative of the lowest permissible engagable gear ratio, said third display section displays zero, one, two or three symbols indicating that the maximum number of consecutive downshifts from the currently engaged gear ratio is zero, one, two or three, respectively.

5. The method of claim 4, wherein if the presence of said conditions are sensed, the additional permissable consecutive downshift is indicated by an intermittent display of a symbol in said third display section.

6. The method of claim 1 additionally comprising:
providing a first section displaying information indicative of the currently engaged gear ratio;
providing a second display section displaying information indicative of the highest permissible engagable gear ratio, said second display section displaying zero, one, two or three symbols indicating the maximum permissible number of consecutive upshifts from the currently engaged gear ratio is zero, one, two or three, respectively; and
providing a third display section displaying information indicative of the lowest permissible engagable gear ratio, said third display section displays zero, one, two or three symbols indicating that the maximum number of consecutive downshifts from the currently engaged gear ratio is zero, one, two or three, respectively.

7. The method of claim 6, wherein if the presence of said conditions are sensed, the additional permissible consecutive downshift is indicated by an intermittent display of a symbol in said third display section.

8. A system of controlling a vehicular semi-automatic mechanical change gear transmission system (10) comprising a manual fuel throttle control (24), a fuel throttle controlled engine (14), a multi-speed change gear mechanical transmission (12), a friction clutch (16) interposed the engine and transmission, a manually operated shift selection lever (1) to select upshifts and downshifts from the currently engaged gear ratio, a central processing unit (38) for receiving inputs indicative of transmission input shaft and output shaft rotational speeds, of vehicle speed, of engine speed and of operation of said shift selection lever and for processing same according to predetermined logic rules to determine the currently engaged gear ratio and the permissibly engaged gear ratios of said transmission under current operating conditions and to issue command output signals to non-manually controlled operators including a fuel throttle control operator (26), and a transmission operator (34); said system characterized by:
means for sensing the presence or absence of conditions indicative of high resistance to forward movement of the vehicle; and
if the presence of conditions indicative of high resistance to forward movement of the vehicle are sensed, permitting the engagement of the gear ratio one ratio lower than the lowest gear ratio permissibly engaged in the absence of said conditions at current vehicle speed.

* * * * *